(12) United States Patent
Smith et al.

(10) Patent No.: US 9,372,984 B2
(45) Date of Patent: Jun. 21, 2016

(54) AUTHENTICATED LAUNCH OF VIRTUAL MACHINES AND NESTED VIRTUAL MACHINE MANAGERS

(75) Inventors: Ned M. Smith, Hillsboro, OR (US); Ravi L. Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 13/993,095

(22) PCT Filed: Sep. 30, 2011

(86) PCT No.: PCT/US2011/054126
§ 371 (c)(1),
(2), (4) Date: Jun. 11, 2013

(87) PCT Pub. No.: WO2013/048425
PCT Pub. Date: Apr. 4, 2013

(65) Prior Publication Data
US 2013/0276057 A1    Oct. 17, 2013

(51) Int. Cl.
*G06F 21/44*    (2013.01)
*G06F 21/00*    (2013.01)
*G06F 9/455*    (2006.01)

(52) U.S. Cl.
CPC ............ *G06F 21/44* (2013.01); *G06F 9/45558* (2013.01); *G06F 21/00* (2013.01); *G06F 2009/45562* (2013.01); *G06F 2009/45566* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 2007/0106986 A1* | 5/2007 | Worley, Jr. | 718/1 |
| 2008/0235754 A1 | 9/2008 | Wiseman | |
| 2009/0249053 A1 | 10/2009 | Zimmer | |
| 2010/0186012 A1 | 7/2010 | Imada et al. | |
| 2010/0281273 A1* | 11/2010 | Lee et al. | 713/190 |
| 2011/0029974 A1 | 2/2011 | Broyles | |
| 2011/0047544 A1* | 2/2011 | Yehuda et al. | 718/1 |
| 2011/0145598 A1 | 6/2011 | Smith et al. | |
| 2011/0167472 A1 | 7/2011 | Evans | |
| 2012/0131574 A1* | 5/2012 | Day et al. | 718/1 |
| 2013/0054969 A1* | 2/2013 | Charles et al. | 713/169 |
| 2014/0053272 A1* | 2/2014 | Lukacs et al. | 726/24 |
| 2014/0310704 A1* | 10/2014 | Cantu | 718/1 |
| 2014/0380009 A1* | 12/2014 | Lemay et al. | 711/163 |

FOREIGN PATENT DOCUMENTS

| | | |
|---|---|---|
| CN | 102103673 | 3/2011 |
| JP | 2007-35045 | 2/2007 |
| KR | 10-2010-0008678 | 1/2010 |

OTHER PUBLICATIONS

Yu et al, "A Low Overhead and Reliable Nested Virtualization VMM for Cloud Computing", 2013, 10th Web Information System and Application Conference, p. 400-405.*

(Continued)

*Primary Examiner* — Christopher Revak
(74) *Attorney, Agent, or Firm* — Trop, Pruner & Hu, P.C.

(57) ABSTRACT

An embodiment of the invention provides for an authenticated launch of VMs and nested VMMs. The embodiment may do so using an interface that invokes a VMM protected launch control mechanism for the VMs and nested VMMs. The interface may be architecturally generic. Other embodiments are described herein.

19 Claims, 3 Drawing Sheets

(56) References Cited

OTHER PUBLICATIONS

Zhang et al, "CloudVisor: Retrofitting Protection of Virtual Machines in Multi-tenant Cloud with Nested Virtualization", Oct. 2011, ACM, p. 203-216.*
Agesen et al, "The Evolution of an x86 Virtual Machine Monitor", Dec. 2010, ACM SIGOPS Operating System Review, vol. 44, Issue 4, p. 3-18.*
Pan et al, "NestCloud: Towards Practical Nested Virtualization", 2011, 2011 International Conference on Cloud and Service Computing, p. 321-329.*
Greene, James, "Intel Trusted Execution Technology: Hardware-based Technology for Enhancing Server Platform Security" Whitepaper, 2010, 8 pages.
Wikipedia, "Trusted Platform Module" Wikipedia: The Free Encyclopedia, Sep. 1, 2011, 1 page.
Gillespie, Matt, "Intel Trusted Execution Technology: A Primer" Intel Corporation, Jun. 1, 2009, 3 pages.
European Patent Office, "Communication: Extended European Search Report," mailed Mar. 24, 2015, in European application No. 11873157.9-1954/2761438 PCT/US2011054126.
Gebhardt, C. et al., "Preventing hypervisor-based rootkits with trusted execution technology," Network Security, Elsevier Advanced Technology, vol. 2008, No. 11, Nov. 2008, pp. 7-12.
Japanese Patent Office, "Notice of Reasons for Rejection," mailed May 12, 2015, in Japanese application No. 2014-533261.
Munetoh, Seiji et al., "Features, Linux Security Features 5, New features on Linux for realizing high reliability" Information Processing, General incorporated association, Information Processing Society of Japan, Oct. 15, 2010, the vol. 51, item 10, pp. 1284-1293.
Kimihiro, Suwa et al., "Policy Enforcement Mechanism based on both User Identity and User's Computer Environment in a Virtual Machine," Information Processing Society research report, General incorporated association, Information Processing Society of Japan, Mar. 6, 2008, vol. 2008, No. 23, pp. 31-36.
Korean Intellectual Property Office "Notice of Preliminary Rejection" in application 10-2014-7008372 Mailed on Jun. 24, 2015.
International Searching Authority, "Notification of Transmittal of the International Search Report and the Written Opinion of the International Searching Authority," mailed May 14, 2012, in International application No. PCT/US2011/054126.
Korean Intellectual Property Office, Notice of Final Rejection mailed Mar. 2, 2016 in Korean Patent Application No. 10-2014-7008372.
State Intellectual Property Office, P.R. China, Office Action mailed Mar. 15, 2016 in Chinese Patent Application No. 201180073818.0.

* cited by examiner

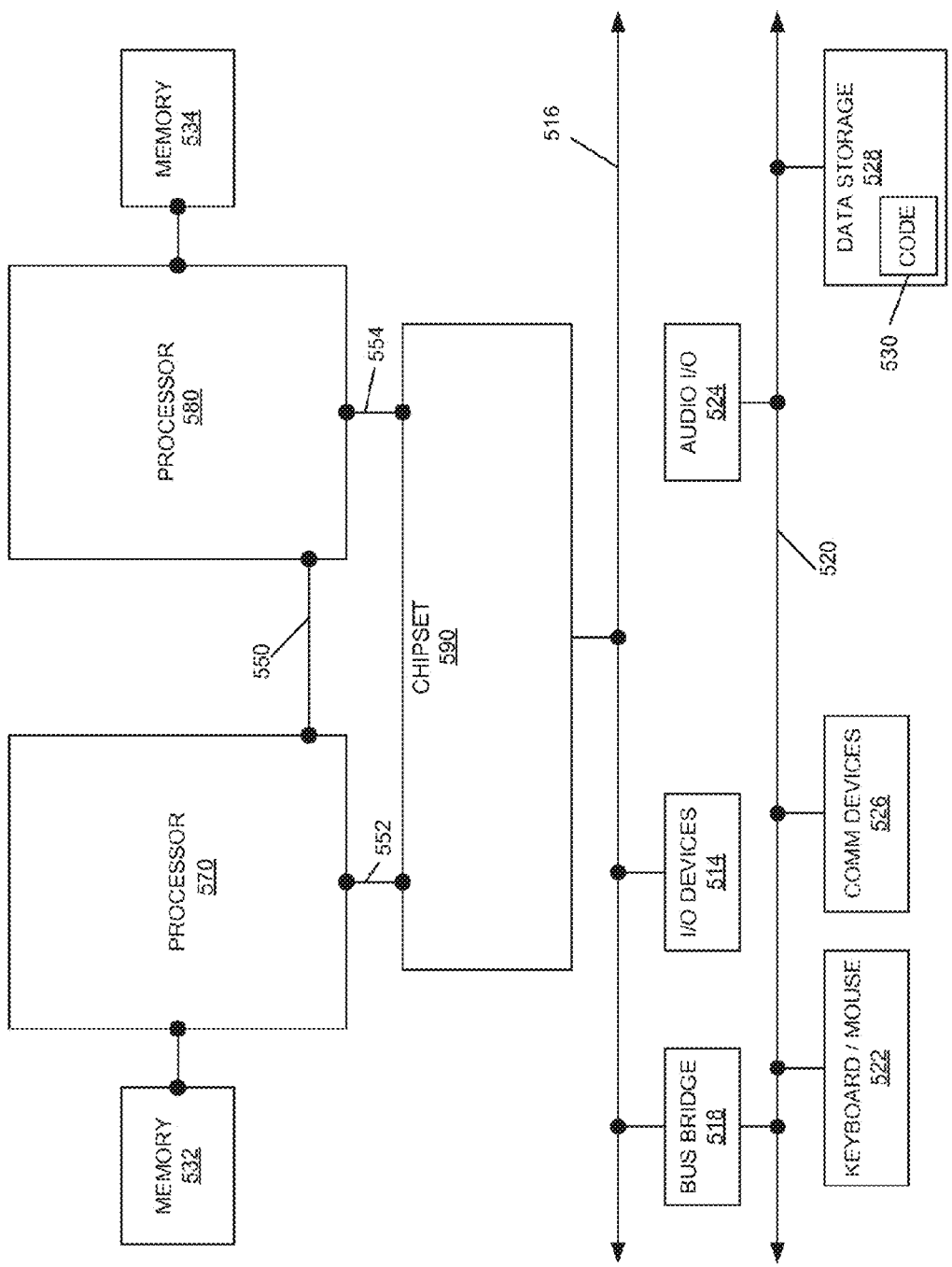

AUTHENTICATED LAUNCH OF VIRTUAL MACHINES AND NESTED VIRTUAL MACHINE MANAGERS

BACKGROUND

A "launch control" or launch control policy (LCP) is part of a comprehensive endpoint protection solution. Traditional anti-virus scans employ a "black listing" technique that aims to identify known "bad" software. Attack signatures guide the scan engine as it searches platform resources. Compromised resources are flagged for remediation. "White listing" involves creating a list of known "good" software that is supplied to a scan engine that flags resources not on the list for remediation. Black and white listing can work together to account for all resources on a system. A launch control integrates the white list scan engine into a system launch procedure to prevent malware from gaining an opportunity to execute on the system. For example, the whitelist may contain reference measurements of code and data (e.g., hash) used to boot or launch an execution environment (e.g., dynamically launched environment). Thus, launch controls can be used to ensure a "trusted boot" occurs.

Trusted boot usage may impact every stage of the boot flow and may be based on trusted hardware also known as "roots-of-trust". Trusted Execution Technology (TXT) is an example of a launch control and a root-of-trust technology that can be used to implement a trusted boot usage for virtual environments. Hardware roots-of-trust help trusted boot usage eliminate or lessen the possibility of malware posing as legitimate hardware to the layers above. TXT implements a dynamic root of trust for measurement (RTM) that employs launch control policy to ensure only a trusted environment is launched. Put another way, TXT may be a starting point in a sequence of integrity checks performed for different execution environments in a platform. Thus, TXT may offer a secure starting point in microcode. For example, various launch controls such as the TXT launch control ensure that the virtual machine manager (VMM) Launcher is trustworthy.

A VMM may include a host program that allows a computer to support multiple execution environments. For example, a VMM may provide the means, through emulation, to divide a single, physical machine (e.g., server), allowing multiple operating systems to run securely on the same CPU and increase the CPU utilization. A VMM can manage VMs. A VM may include a software implementation of a machine (i.e. a computer) that executes instructions like a physical machine.

Again regarding the TXT launch control, such launch controls do not ensure subsequently launched VMM infrastructure (e.g., virtual machines (VMs), nested VMMs, nested VMs, and operating system (OS) environments) is also trustworthy. Thus, the launch control can indeed be used to launch a single VMM. However, once the VMM is running TXT model specific registers (MSRs) are set such that TXT is not invoked while a VMM using VMX-root is active. Consequently, when a nested VMM is launched TXT may not be available (e.g., the GETSEC(SENTER) command fails) and the nested VMM may not be securely launched. VMs and nested VMMs are then loaded without application of launch control policy, thereby creating a potential opportunity for a security breach.

BRIEF DESCRIPTION OF THE DRAWINGS

Features and advantages of embodiments of the present invention will become apparent from the appended claims, the following detailed description of one or more example embodiments, and the corresponding figures, in which:

FIG. 3 includes a system for use with embodiments of the invention.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment of the invention provides for an authenticated launch of VMs and/or nested VMMs. The embodiment may do so using an interface that invokes a VMM protected launch control mechanism for the VMs and nested VMMs. The interface may be architecturally generic. Some embodiments may use TXT launch control policy extended to cover VMs and VMMs.

Figure 1:
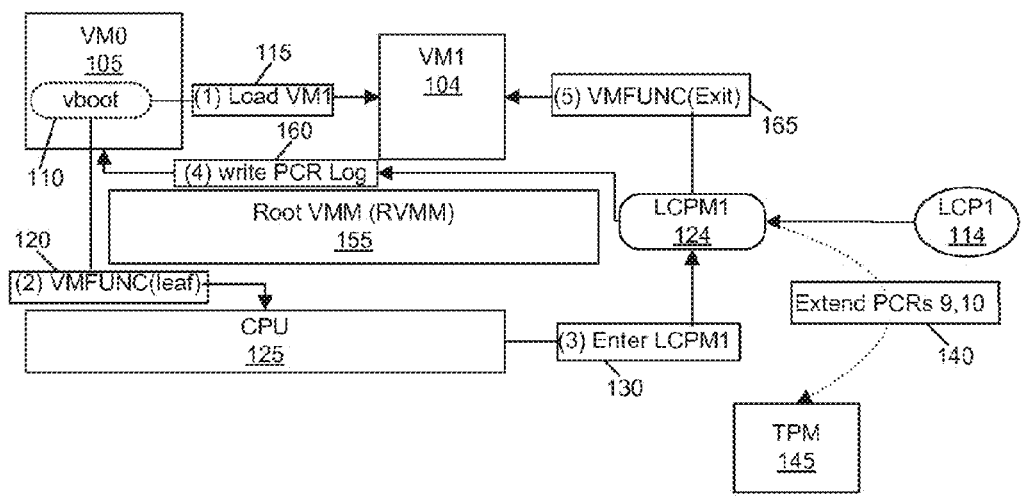
FIG. 1 includes a schematic flow chart for an embodiment of the invention.
Figure 2:
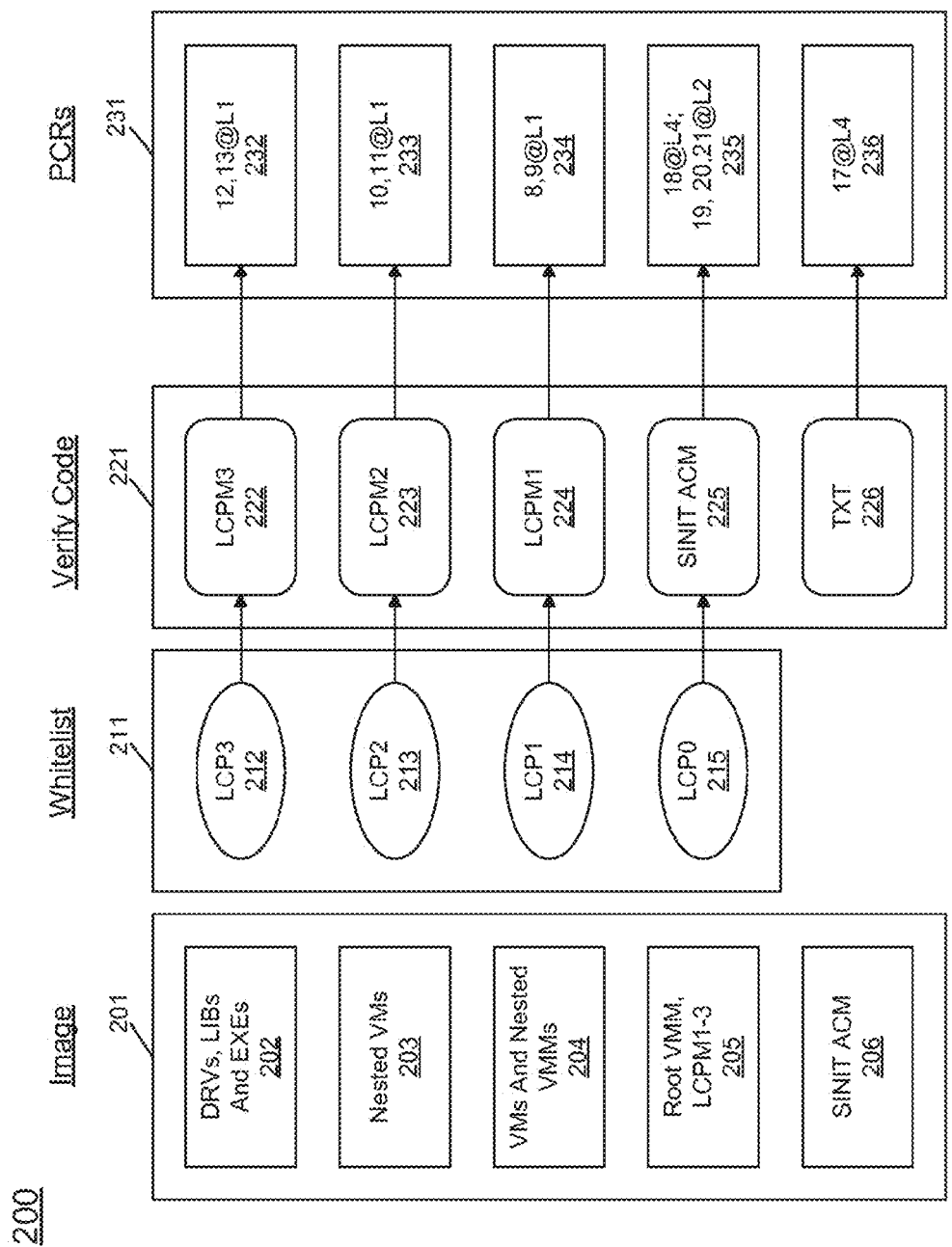
FIG. 2 includes a block diagram indicating organization of various aspects of an embodiment of the invention.

FIG. 1 includes a schematic flow chart for an embodiment of the invention. FIG. 2 includes a block diagram indicating organization of various aspects of an embodiment of the invention. FIGS. 1 and 2 are discussed below in conjunction with one another, however, the embodiments in each figure are not necessarily limited to working with one another.

FIG. 2 includes an organizational representation 200 that, in brief and as will be more fully explained below, comprises a collection of images 201, launch control policies 211 with their representative whitelists that correspond to images 201, and verification code modules (e.g., launch control modules (LCPM)) 221 that include code to authenticate candidate code images 201 against measurements in white lists 211. In an embodiment, LCPMs are dynamic modular code objects that execute with root VMM privileges. Platform configuration registers (PCRs) 231 store image measurements.

Initially a root VMM (VMMO) 155 boots. This boot may be a secure boot implemented via any number of secure boot mechanisms. One such mechanism, as addressed above, includes the TXT launch control. Information regarding TXT launch control is available, in the least, at http://software-intel-com/en-us/articles/intel-trusted-execution-technology-a-primer/, http://download-intel-com/technology/security/downloads/315168-pdf, as well as other publically available locations.

Securely launching the root VMM (VMM0) may include several actions. TXT 226 may operate as a launch control policy to ensure certain images, such as SINIT ACM 206, are authentic. SINIT ACM concerns an authenticated code module used in the secure boot process. The measurement of SINIT ACM 206 is stored in PCR 17 (236). A PCR is a trusted platform module (TPM) register that contains a cryptographic hash of security relevant information (e.g., hash of code executed by a trusted execution environment such as a VMM and the loader code used to launch it).

During the secure launch of VMM0, LCP0 215 may be compared against the root VMM0 205 image using SINIT ACM at block 225. Also, LCP0 215 and SINIT ACM 225 may be used to authenticate LCPM1, LCPM2, LCPM3 205 images, some of which may be used in later stages (e.g., nested VMM boot) discussed below. These measurements are stored in PCR 18 for VMM0 and PCRs 19, 20, 21 respectively for LCPM1, LCPM2, LCPM3.

As a brief aside, the exact PCRs used for storage are configurable and may change in other embodiments. For example, the PCR allocation guidelines may be outlined in a specification. Such specifications include the Trusted Computing Group (TCG) PC Client specification and the TPM specification, which reserve PCRs 17, 18, 19, 20, and 21 for use by a dynamic root of trust (e.g., TXT). PCR 17 may be used by SENTER to measure the ACM. The ACM may use PCR 18 to measure the VMM Launcher. The VMM Launcher may use PCR 18 and optionally PCR 19 to measure the VMM. The VMM may virtualize the TPM and therefore may use the other PCRs for measuring VMs (and LCPMs for that matter). PCRs 20 and 21 may also be available for use by the VMM. Further still, multiple LCPM measurements may be included into the same PCR. Thus, the usage of PCRs is configurable and may change with varying embodiments.

Returning to FIG. 1, a bootstrapped loader, such as VM0 105, is virtually booted via block 110. Block 115 begins the process of booting an entity such as virtual machine VM1 104 (found in element 204 of FIG. 2). (The "entity" could also be a nested VMM but VM1 will be used for purposes of explanation in this example.) When VM1 104 is launched, bootstrap loader VM0 105 invokes an instruction, such as a VMFUNC interface instruction specifying a leaf that leads to LCPM1 124 (224 in FIG. 2) launching VM1 104. The VMFUNC interface may prevent interrupts or set VM control bits so LCPM1 224 will be permitted to execute without any interruption of the measurement process. This interface may also quiesce the other processors on the system so that the measurement can occur without interference from other processors. Furthermore, VMFUNC acknowledges that microcode may already be considered a safe place to perform integrity checks and integrity checking control based on, for example, the use of TXT. VMFUNC is discussed further below.

Accordingly, via block 130 execution control passes to the LCPM1 124 (element 224 in FIG. 2). In an embodiment, LCPM1 operates as a VM running on VM1. LCPM1 124 locates VM1 104 in memory and performs an integrity measurement based on LCP1 114 (element 214 in FIG. 2) intended for LCPM1 and verifies the computed measurement is accepted by one of the policies in the LCP1. The LCP may include whitelists, which describe expected software images possibly secured from a trusted server. Specifically, in an embodiment LCPM1 reads LCP1 into memory, such as protected memory located in extended page tables (EPTs). EPTs are discussed in greater detail below with regard to the VMFUNC interface.

In block 140 the measurement of VM1 is extended into PCRs (e.g., PCR 8) 234, which are included in TPM 145 or other such hardware attestation module. A TPM is a security co-processor that implements a variety of security capabilities related to secure storage and secure reporting. Details regarding cryptographic processors, like a TPM, may be found at least at: "Trusted Platform Module (TPM) based Security on Notebook PCs—White Paper" by Sundeep Bajikar, http://www-intel-com/design/mobile/platform/downloads/Trusted_Platform_Module_White_Paper-pdf. In block 160 the PCR log is updated. Embodiments are not limited to operation with VMFUNC, TPMs, and the like but such elements are used merely for illustrative purposes. Then, VM1 is scheduled for execution by root VMM 155 (included in element 205 of FIG. 2). In block 165, VMFUNC(exit) is executed.

The process embodiments described above (regarding FIGS. 1 and 2) are also applicable to a nested VMM instead of the VM1 used for explanation purposes. Along these lines, both VMs (e.g., VM1) and nested VMMs are included in block 204 of FIG. 2. In other words, whereas FIG. 1 describes the secure boot of VM1 the same process could be used to securely boot a nested VMM.

As indicated in FIG. 2, additional layers of virtualization may be secured. For example, via LCPM2 223, nested VMs 203 may be measured and compared to measurements included in LCP2 213. Measurements may be stored via PCRs 233. Furthermore, via LCPM3 221, drivers, libraries, and executable code 202 may be measured and compared to measurements included in LCP3 212. Measurements may be stored via PCRs 232.

As a more specific example regarding nested VMs, bootstrapped loader VM0 105 is virtually booted via block 110. Block 115 begins the process of booting nested VM2 203. When VM2 203 is launched, bootstrap loader VM0 105 invokes an instruction, such as a VMFUNC interface instruction specifying a leaf that leads to LCPM2 223 launching VM2 203. Via block 130 execution control passes to LCPM2 223, which locates VM2 203 in memory and performs an integrity measurement based on LCP2 213 intended for LCPM2 and verifies the computed measurement is accepted by one of the policies in LCP2. In block 140 the measurement of VM2 is extended into PCRs 233, which are included in a TPM. In block 160 the PCR log is updated. Then, in block 155 VM2 is scheduled for execution by root VMM 155. In block 165, VMFUNC(exit) is executed.

The process embodiments described immediately above (regarding FIGS. 1 and 2) are also applicable to a nested VMM that is further nested within another entity.

Thus, block 110 leads to a root VMM (105) launching a LCPM (225). The LCPM is for evaluating an LCP with images for VMs that will be loaded into protected memory. Similarly, a LCPM for nested VMMs may also load (even though this is not specifically shown in FIG. 1). The root VMM LCP is used to validate the integrity of the LCPMs. Furthermore, a VM or nested VMM is more securely launched than when the VM or nested VMM are launched from a root VMM, even a securely booted root VMM. Instead, the root VMM is not directly relied upon (i.e., it is bypassed) and instead a TXT hardware based sequence (or other hardware attestation module based method) is relied upon to boot the VM or nested VMM. In one embodiment, launch control mechanisms, tools and infrastructure, typically limited to only work with a root VMM, are extended to work with VMs and VMMs. For example, launch control is now extended beyond TXT and similar security techniques. Embodiments continue the whitelist checking process kicked off by, for example, TXT launch control and/or BIOS trusted boot mechanisms, into nested VMM and VM environments. Based on trusted system boot, trusted root VMM boot, and trusted nested VMM and/or VM boots, embodiments may provide trust broker services with a continuous chain-of-trust reaching back to the root-of-trust. This chain-of-trust may be built based on, for example, the contents of the PCR log.

Regarding the VMFUNC instruction, typically VMs and nested VMMs are loaded without application of a launch control policy. Further, VMM vendors do not rely on a common architectural interface for launch control. However, with various embodiments of the invention, the root VMM can use the VMFUNC call (or its functional equivalent) to invoke a launch control policy module as described above. The LCPM understands how to parse and validate whitelists included in the LCP policies. The LCP policies may be specific to the type of image being loaded (e.g., VM or nested VMM). The LCPM executes with appropriate protections of the root VMM. The VMFUNC call ensures that VMs and nested VMMs are invoked according to a consistent vendor independent manner such that LCP authors are able to construct LCPs that span or work consistently across different vendor implementations of VMMs and VMs. Thus, the VMM vendor does not have to maintain significantly different product/installation stock keeping units (SKUs) for VMMs that function as either root or nested VMM.

Further regarding VMFUNC, VMFUNC is an architectural interface that uses EPT memory protections. EPT is virtualization technology for the memory management unit (MMU). When this feature is active, ordinary IA-32 page tables (referenced by control register CR3) translate from linear addresses to guest-physical addresses. A separate set of page tables (i.e., the EPT tables) translate from guest-physical addresses to the host-physical addresses that are used to access memory. As a result, guest software can be allowed to modify its own IA-32 page tables and directly handle page faults. This allows a VMM to avoid the VM exits associated with page-table virtualization, which are a major source of virtualization overhead without EPT. VMFUNC utilizes the EPT by isolating, for example, LCP1 (114) and LCPM1 (124) using the EPT. In doing so, LCPM1 is protected from write operations originating from outside a VMFUNC entry point. Measurements can then be stored in registers included within the TPM. Further, the EPT may be active only on a particular hardware thread, thus disallowing other software which may be executing on other hardware threads from tampering with or interfering with the measurement of LCP1.

In an embodiment, EPTs may be used to specify boundaries in memory for LCPMs. It may be beneficial to re-check LCPM code (without checking all the VMM code) when a VM is loaded because, for example, the LCPM code specifically implements policy enforcement rules. This check is not re-loading the VMM code. Instead, the check is an in-memory check (e.g., memory pages in EPT are rehashed and compared to a whitelist corresponding to an in-memory image). PCRs 19, 20, 21 can be used for these re-measurements since those PCRs do not contain a full measurement of the VMM (which may be included in PCR 18).

More specifically, in an embodiment an EPT is used to define groups of memory pages that have special properties and/or uses. The embodiment uses an EPT to construct a subset of VMM code and data pages that implement LCPM (e.g., code) and LCP (e.g., data) functionality. When VMFUNC vectors control to the VMM, a new leaf in VMFUNC can be used to verify the EPT, which contains the LCPM, and LCP pages have not changed since first being launched. An embodiment may implement this in a manner analogous to an address range. The LCPM pages may be checked/verified to ensure they have not been moved, lengthened, and/or shortened. If VMFUNC is used to enforce an integrity policy, the expected LCPM and LCP measurements can be passed in to VMFUNC as parameters to the new leaf. Then VMFUNC can compare EPT measurements before passing execution to the LCPM code. VMFUNC may indicate a fault if the comparison does not produce a match.

In an embodiment, the root VMM functionality may be partitioned according to CPU ring structures such that the invocation of VMFUNC is performed at Ring0 and execution of LCPMs is performed at Ring1. The rest of the VMM functionality can be implemented at Ring2 and Ring3. This implementation allows hardware mechanisms to protect/harden the LCPMs and VMFUNC invocations. The VMFUNC leaf for supporting LCPM may enforce that this particular leaf can only be invoked by a guest VMM at ring0. In an embodiment the root VMM would use TXT. For example, TXT would be used to launch VMM/VMMlauncher. Once launched, the LCPM in VMM would be used to launch the guest. Thus, rings could be used to further isolate and separate launch functionality from other, non-security related functionality within the VMM and VMM Infrastructure.

Embodiments are suitable for several environments, including verified boot environments and measured boot environments.

Verified boot accepts a whitelist from a trusted server that describes expected software images. A trusted component of the client platform inspects the software image before it executes and compares it to the whitelist. If there is a match, then the component is permitted to execute. If not, a remediation action is executed. The component that performs this operation is sometimes referred to as a root-of-trust for verification. This may not require a hardware attestation module (e.g., TPM).

Measured boot, however, inspects the software image before it executes and saves it in a secure storage location. It may not have a whitelist that constrains or alters the boot. Instead, the whitelist is maintained at a server hosting resources the client wishes to access. An integrity report of the software is delivered to the server as a precondition of the server granting access. Presentation of the report to the server is sometimes called attestation. The server compares the attestation report to the whitelist to determine if the client poses a significant risk. If it does, the network connection is closed. This may utilize a hardware attestation module (e.g., TPM).

In further detail, in various embodiments a verified boot enforces an integrity policy directly (i.e., it may prevent execution of code that does not satisfy the integrity policy). Measured boot, however, may allow execution of code that does not satisfy the integrity policy because, for example, the integrity policy may in fact live on a remote server and may not be known by the client. Therefore, the client may securely store the measurement (e.g., in a TPM PCR) where it will be "quoted" later and delivered to the server as part of an "attestation". The server can compare the actual measurement found in the attestation with the measurement on its local copy of the whitelist. Enforcement can be applied by the server by dropping network connectivity or by placing the client in a remediation network where update services may attempt to reconfigure the client (e.g., PC).

Thus, an embodiment launches a first VMM; authenticates a launch of a second VMM; and nests the second VMM within the first VMM. Instead or in addition to the authenticated boot of the nested VMM, an embodiment may authenticate a launch of a first VM; and manage the first VM with a first VMM (e.g., a root VMM) or a nested VMM. In either of the immediately preceding scenarios a root VMM or VMM that hosts another VMM or a VM, that root or host VMM may be booted via a non-reentrant secure boot (e.g., via TXT launch).

An embodiment may authenticate the launch of the second VMM by bypassing a root VMM while both (a) invoking a second LCPM, and (b) using a hardware security attestation module (such as, but not limited to, a TPM).

Regarding an example for "bypassing" a root VMM, a root VMM may treat nested VMMs as if they were VMs. Thus, the launch control both VMs and VMMs would be similar from the root VMM perspective. Focusing on nested VMMs, when the nested VMM executes it will identify VMs that it will load. The LCPM code for measuring the nested VMM is contained in the nested VMM page range. So VMFUNC may ensure the EPT describing a nested VMM is different than an EPT describing a root VMM. Thus, the root VMM can be bypassed to some extent for this operation if the root VMM opts-in. This may be based on, for example, EPT usage as well as VMFUNC and use of a bootstapped VM0 (see FIG. 1) for booting the nested VMM.

An embodiment may evaluate a second LCP, associated with the nested second VMM, via a second LCPM. The embodiment may perform, via the second LCPM, an integrity measurement of the second VMM and authenticate the measurement via the second LCP. The embodiment may extend the measurement into a PCR included in a TPM or other hardware attestation module; and update a log based on extending the measurement into the PCR.

An embodiment may load the second LCPM into protected memory (e.g., EPTs) and execute the second LCPM, wherein the second LCPM has root VMM privileges. An embodiment may enable the system to authenticate, via the second LCPM, a whitelist included in the second LCP, wherein the second LCP is specific to VMMs but not VMs. Also, an embodiment may authenticate the second LCP, while booting the first VMM, based on a first LCP associated with the first VMM. Further, an embodiment may authenticate the launch of the second VMM via a secure interface not specifically configured for the second VMM (e.g., architecturally neutral or vendor neutral) and which is configured to interface both VMMs and nested VMMs.

Embodiments may be implemented in many different system types. Referring now to FIG. 3, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include a TPM or cryptographic processor that includes, for example, RSA accelerators, random number generators, keys, certificates, PCRs, static RAM, flash memory, monotonic counters, digital signature algorithms, and the like. Details regarding one example of such a chipset are available at least at: http://www-intel-com/design/mobile/platform/downloads/Trusted_Platform_Module_White_Paper-pdf. Embodiments are not limited to working with any one type of security engine or cryptographic processor and may instead work with various discrete and/or integrated security engines with various architectures from various vendors. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a non-transient machine-accessible storage medium including instructions that when executed enable a system to:
   launch a first virtual machine manager (VMM);
   authenticate a launch of a second VMM; and
   nest the second VMM within the first VMM;

wherein authenticating the launch of the second VMM includes bypassing the first VMM while both (a) invoking a second launch control policy module (LCPM), and (b) using a hardware security attestation module.

2. The article of claim 1 including instructions that enable the system to:
authenticate a launch of a first virtual machine (VM); and
manage the first VM with one of the first VMM and the second VMM.

3. The article of claim 1 wherein the first VMM is a root VMM launched via a non-reentrant secure boot.

4. The article of claim 1, wherein the hardware security attestation module includes a trusted platform module (TPM).

5. The article of claim 1 including instructions that enable the system to evaluate a second launch control policy (LCP), associated with the second VMM, via the second LCPM.

6. The article of claim 5 including instructions that enable the system to perform, via the second LCPM, an integrity measurement of the second VMM and authenticate the measurement via the second LCP.

7. The article of claim 6 including instructions that enable the system to:
extend the measurement into a platform configuration register (PCR) included in a trusted platform module (TPM); and
update a log based on extending the measurement into the PCR.

8. The article of claim 5 including instructions that enable the system to load the second LCPM into protected memory and execute the second LCPM, wherein the second LCPM has root VMM privileges.

9. The article of claim 5 including instructions that enable the system to authenticate, via the second LCPM, a whitelist included in the second LCP, wherein the second LCP is specific to VMMs but not VMs.

10. The article of claim 5 including instructions that enable the system to authenticate the second LCP, while booting the first VMM, based on a first LCP associated with the first VMM.

11. The article of claim 1 including instructions that enable the system to authenticate the launch of the second VMM via a secure interface not specifically configured for the second VMM and which is configured to interface both VMMs and nested VMMs.

12. A method comprising:
launching a first virtual machine manager (VMM);
authenticating a launch of a second VMM; and
nesting the second VMM within the first VMM;
wherein authenticating the launch of the second VMM includes bypassing the first VMM while both (a) invoking a second launch control policy module (LCPM), and (b) using a hardware security attestation module.

13. The method of claim 12 comprising:
authenticating a launch of a first virtual machine (VM); and
managing the first VM with one of the first VMM and the second VMM.

14. The method of claim 12 comprising evaluating a second launch control policy (LCP), associated with the second VMM, via the second LCPM.

15. The method of claim 14 comprising performing, via the second LCPM, an integrity measurement of the second VMM and authenticating the measurement via the second LCP.

16. A system comprising:
a memory;
a processor, coupled to the memory, to (a) launch a first virtual machine manager (VMM); (b) authenticate a launch of a second VMM; and (c) nest the second VMM within the first VMM;
wherein the processor is to authenticate the launch of the second VMM by bypassing the first VMM while both (a) invoking a second launch control policy module (LCPM), and (b) using a hardware security attestation module.

17. The system of claim 16, wherein the processor is to:
authenticate a launch of a first virtual machine (VM); and
manage the first VM with one of the first VMM and the second VMM.

18. The system of claim 16, wherein the processor is to evaluate a second launch control policy (LCP), associated with the second VMM, via the second LCPM.

19. The system of claim 18, wherein the processor is to perform, via the second LCPM, an integrity measurement of the second VMM and authenticate the measurement via the second LCP.

* * * * *